United States Patent [19]

Albert

[11] Patent Number: 4,723,850
[45] Date of Patent: Feb. 9, 1988

[54] LINEAR BALL BEARING DEVICE

[75] Inventor: Ernst Albert, Sand/Main, Fed. Rep. of Germany

[73] Assignee: Deutsche Star Kugelhalter GmbH

[21] Appl. No.: 836,260

[22] Filed: Mar. 5, 1986

[30] Foreign Application Priority Data

Apr. 10, 1985 [DE] Fed. Rep. of Germany ....... 3512858

[51] Int. Cl.[4] .......................................... F16C 29/06
[52] U.S. Cl. ...................................... 384/43; 384/45
[58] Field of Search ............... 384/43, 45, 40, 13; 464/168

[56] References Cited

U.S. PATENT DOCUMENTS

| 851,728 | 4/1907 | Bayrer | 384/43 |
| 4,040,679 | 8/1977 | Teramachi | |
| 4,391,473 | 7/1983 | Teramachi | |
| 4,508,395 | 4/1985 | Heine | 384/43 |
| 4,527,842 | 7/1985 | Teramachi | 384/45 |

FOREIGN PATENT DOCUMENTS

| 2019506 | 11/1971 | Fed. Rep. of Germany . |
| 2318799 | 10/1973 | Fed. Rep. of Germany . |
| 3005579 | 8/1980 | Fed. Rep. of Germany . |
| 3015430 | 11/1980 | Fed. Rep. of Germany . |
| 3417159 | 11/1984 | Fed. Rep. of Germany . |
| 1263179 | 4/1961 | France . |
| 2341066 | 9/1977 | France . |
| 2093536 | 9/1982 | United Kingdom . |

OTHER PUBLICATIONS

Star Linear-Set mit Radial-Kugelbüchse, pp. 45 & 46 (no date).

Primary Examiner—Lenard A. Footland
Attorney, Agent, or Firm—Toren, McGeady & Associates

[57] ABSTRACT

A linear ball-bearing device for guiding an object along a cylindrical shaft including comprising a bearing block having a contact surface for contacting the object and having a plurality of ball loops, each ball loop comprising radially inner and radially outer ball rows interconnected by curved ball deflection rows, the radially inner ball rows being supported radially outwardly on axially extending load-carrying surfaces which are provided on a cylindrical inner surface of the bearing block, the radially outer ball rows running in return channels in the bearing block and the deflection-curve ball rows being guided by concave semi-circular grooves which are arranged on a cage sub-assembly, the cage sub-assembly having hook flanges each of which has an axially inwardly directed hook end surface engaging an axially outwardly directed channel aperture surface of the respective return chamber, each hook flange also having an outer peripheral surface for engagement with an inner peripheral surface of the bearing block, the load-carrying surfaces, the return channels, the inner peripheral surfaces and the channel aperture surfaces being integrally formed on the material of the bearing block.

25 Claims, 8 Drawing Figures

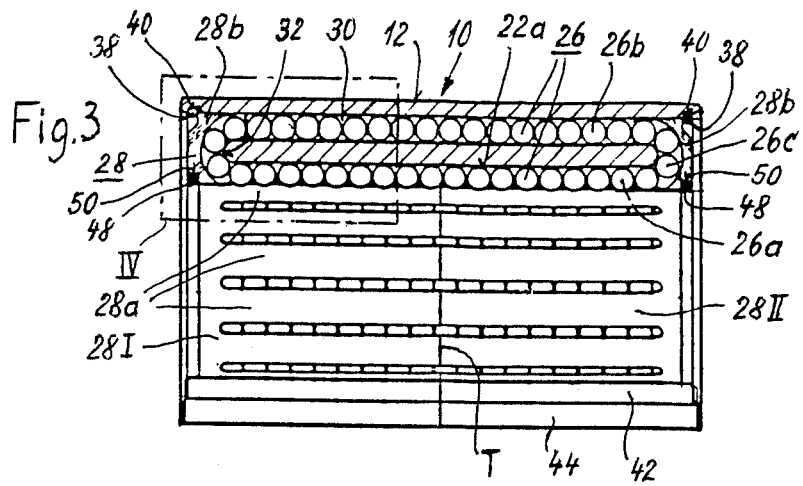
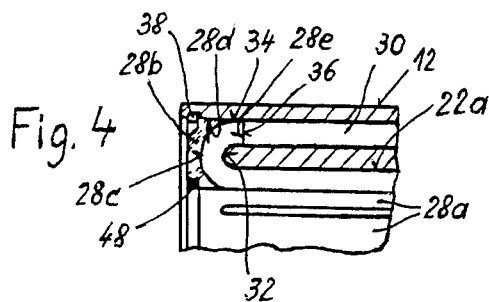
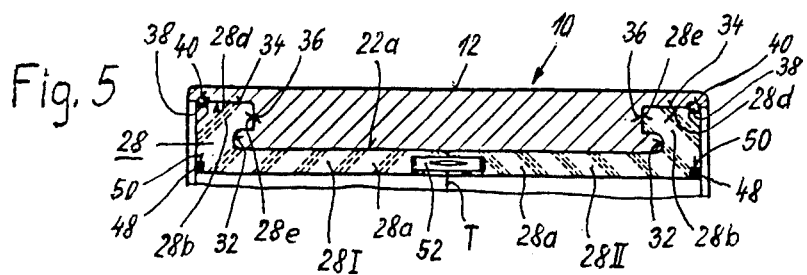
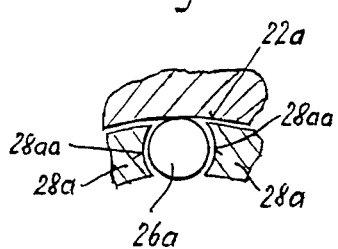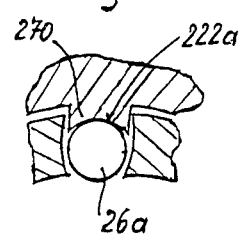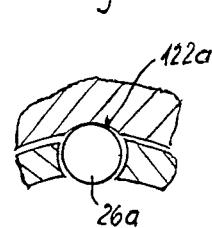

LINEAR BALL BEARING DEVICE

FIELD OF THE INVENTION

The invention relates to a linear ball bearing device for guiding an object along a cylindrical shaft.

BACKGROUND OF THE INVENTION

A linear ball bearing device is known which comprises a bearing block having a substantially flat contact surface integrally formed thereon for contact with the object. The bearing block has fastening means for the connection of the bearing block to the object and has a plurality of ball loops which are in each case arranged in radial planes with respect to the axis of the cylindrical shaft. Each of the ball loops comprises a radially inner, load-carrying ball row, a radially outer ball row running in the reverse direction and—close to the axial ends of the bearing block—curved ball deflection rows or junctures for connecting the respective radially inner, load-carrying ball row to the radially outer ball now running in the reverse direction. The radially inner ball rows are supported radially outwardly on axially extending load-carrying surfaces which are provided on a cylindrical inner surface. The load-carrying surfaces extend between guide surfaces spaced in the peripheral direction. The radially outer ball rows run in return channels, the curved ball deflection rows or junctures being guided by a convex toroidal surface directed axially outwardly and by concave semi-circular grooves directed axially inwardly, the guide surfaces and the semi-circular grooves being arranged on a cage sub-assembly. The cage sub-assembly has guide webs extending over the length of the load-carrying surfaces and, on the axial ends of the guide webs, has hook flanges which connect with the latter and which have the semi-circular grooves. Each hook flange has an axially inwardly directed hook end surface which engages an axially outwardly directed channel aperture surface of the respective return channel. Each of these hook flanges has an outer peripheral surface for contact with an inner peripheral surface of the bearing block. The cage sub-assembly is divided into two half cages in a dividing plane normal to the axis and cutting the guide webs.

Such a linear ball bearing has been manufactured commercially and is known from a prospectus "STAR Linear-Set mit Radial-Kugelbüchse" ("STAR Linear Set with Radial ball bush").

In the known embodiment, the ball loops are accommodated in a ball bush which is made separately from the bearing block. This known embodiment has therefore proved successful, because, when the ball loops are accommodated in a ball bush which is separate from the bearing block, this ball bush can be produced in large production runs and subsequently assembled in various forms of bearing blocks. The disadvantages of this known solution, however, have hitherto not been appreciated.

It has now been recognised, however, that certain problems can nevertheless appear in the known embodiment.

By the installation of a ball bush, having ball loops arranged therein, in a bearing block, precision errors accumulate at the bearing block and at the ball bush, so that maintaining the regularly required close tolerances becomes difficult. The spatial superimposition of ball bush and bearing block also leads to large dimensions with corresponding high weight. However, with regard to restricted installation conditions, large dimensions are often undesirable, and high weight leads to increased inertia forces at high accelerations of the object.

It is therefore an object of the present invention to manufacture with high precision a linear ball bearing device of the type described above which has a undiminished basic load rating and undiminished rigidity, but which at the same time has reduced weight and dimenisons.

SUMMARY OF THE INVENTION

According, therefore, to the present invention, there is provided a linear ball bearing device for guiding an object along a cylindrical shaft, the said device comprising a bearing block having a contact surface for contacting the object and having a plurality of ball loops, each ball loop comprising radially inner and radially outer ball rows interconnected by curved ball deflection rows as junctures, the radially inner ball rows being supported radially outwardly on axially extending load-carrying surfaces which are provided on a cylindrical inner surface of the bearing block, the radially outer ball rows running in return channels in the bearing block and the ball deflection rows being guided by concave semi-circular grooves which are arranged on a cage sub-assembly, said cage sub-assembly having hook flanges each of which has an axially inwardly directed hook end surface engaging an axially outwardly directed channel aperture surface of the respective return channel, each hook flange also having an outer peripheral surface for engagement with an inner peripheral surface of the bearing block, the load-carrying surfaces, the return channels, the inner peripheral surfaces and the channel aperture surfaces being integrally formed on the material of the bearing block.

Preferably, the bearing block has fastening means for fastening an object to the bearing block.

Each ball loop is preferably arranged in a radial plane with respect to the axis of the cylindrical shaft.

The load-carrying surfaces preferably extend between guide surfaces spaced in the peripheral direction, the guide surfaces being arranged on the cage sub-assembly.

The curved ball deflection rows are preferably also guided by a convex toroidal surface which is directed radially outwardly.

The cage sub-assembly preferably has guide webs which extend over the length of the load-carrying surfaces, the hook flanges being provided on the axial ends of the guide webs.

The cage sub-assembly preferably is divided into two half cages in a dividing plane normal to the axis and cutting the guide webs.

It has been shown that the load-carrying surfaces, the return channels, the toroidal surface, the inner peripheral surface and channel aperture surfaces directed axially outwards can be provided on the material of the bearing block with high economy. Consequently, the disadvantage which was previously feared that it would not be possible to achieve large-scale production of standard ball bushes for use in bearing blocks of different forms has been overcome.

The linear ball bearing devices according to the invention are intended, for example, for the guidance of slides in machine tools.

The linear ball bearing devices according to the invention can be designed in such a way that they partially enclose the cylindrical shaft, that is, they may be made with an opening. In this case, the particular shaft can be supported by supports extending through the opening. But it is also possible to design a linear ball bearing device according to the invention with a fully round opening which completely encloses the particular cylindrical shaft and the latter can only be supported outside the bearing block.

Pressure means can be provided for pressing the load-carrying balls against the cylindrical shaft. With regard to such pressure means, when the contact surface is arranged on a side of the bearing block which is remote from the said opening, a slot which is substantially parallel to the bearing surface can be sunk into a lateral surface of the bearing block, the said lateral surface being parallel to the axis and substantially at right angles to the contact surface. The said slot preferably extends approximately to the pitch circle of the return channels. At the same time, a threaded bore, which is substantially perpendicular to the slot plane, can be accommodated in a part of the bearing block, the said part being located on one side of the slot, the threaded bore accommodating a threaded stud which can be fastened against the part of the bearing block which is located on the other side of the slot plane. Generally, the slot depth on the one hand should desirably be large enough to achieve a reasonable adjustment, but on the other hand sufficient residual wall thickness must still remain for adequate strength to be available. It has been shown that, with this embodiment permitting radial play adjustment, the rigidity of the linear ball bearing device against bending moments is least impaired with an axis perpendicular to the contact surface.

The load-carrying surfaces can be formed either by a cylindrical inner surface of the bearing block or by raceway grooves. In the case of raceway grooves, the degree of contact is increased; thus a considerable increase in the basic load rating and a further improvement in rigidity is achieved.

The precision can be further increased in that the guide web sections of the half cages may be dowel-joined to one another in the dividing plane, and it is possible for this dowel joint to be made by means of separate pins which are inserted into receptacles at the guide web ends facing toward one another or by complementary pin and pin receptacles which are integrally formed on the guide web ends facing toward one another.

The bearing block can be provided with a lubricating channel system which starts from a freely accessible surface of the bearing block even when the latter is mounted on the object, so as to be able to feed lubricant at any time. Such a lubricating channel system can be made in a simple manner in that a primary channel, which is substantially parallel to the contact surface, may be bored in a plane substantially normal to the axis. Communicating with the primary channel there may be a secondary channel which is bored from the contact surface, the secondary channel being closed by a plug in the neighbourhood of the contact surface. The secondary channel can then open into the cylindrical inner surface of the bearing block between two adjacent ball loops. In this way, two ball rows are directly supplied with lubricant. The remaining ball rows can then be supplied with the lubricant which flows from the directly supplied ball rows via the shaft periphery.

Sealing elements can be attached to the hook flanges for sealing the lubricant against the escape outwards and for preventing the ingress of dirt and foreign bodies. In fact such sealing elements can be attached to the hook flanges in each case in the neighbourhood of an axially outer and of a radially inner annular edge. In the case of a linear ball bearing device designed only for partially enclosing the cylindrical shaft, it is also possible to provide sealing strips, for contact with the shaft, on the edges of the cage sub-assembly, the edges constituting the said opening.

The cage sub-assembly can be secured in the axial direction by retaining rings which are engaged in locking grooves integrally formed in the bearing block. With regard to achieving linear ball bearings which are easy to construct and have a low weight, it is possible, without impairing the rigidity and the basis load rating, for the distance of the cylindrical inner surface from the mounting surface to be 25% to 50%, preferably 30% to 50%, of the diameter of the associated shaft. The distance of the lateral surfaces of the bearing block from the cylindrical inner surface, which lateral surfaces are parallel to the axis and substantially perpendicular to the mounting surface, can be 65% to 120%, preferably 75% to 120%, of the diameter of the associated shaft.

BRIEF DESCRIPTION OF THE DRAWINGS

The invention is illustrated, merely by way of example, in the accompanying drawings, in which:

FIG. 3 shows a section along line III—III of FIG. 1;

FIG. 4 shows a section corresponding to that of FIG. 3, but without the balls;

FIG. 5 shows a section along line V—V of FIG. 1;

FIG. 6 shows an enlarged partial section at VI of FIG. 1;

FIG. 7 shows a partial section in accordance with FIG. 6 in a modified embodiment;and FIG. 8 shows a partial section in accordance with FIG. 6 in a further modified embodiment.

BRIEF DESCRIPTION OF THE PREFERRED EMBODIMENTS

Figure 1:
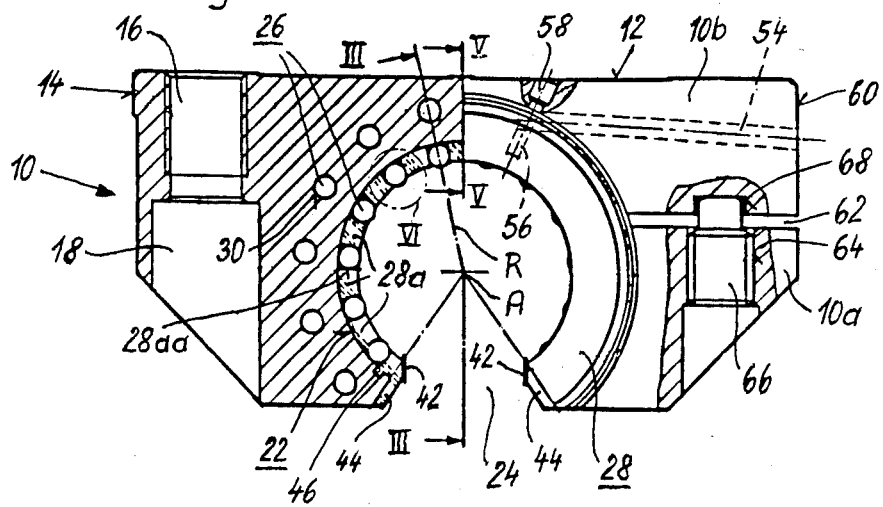
FIG. 1 shows an end view partially in section along line I—I of FIG. 2 through a linear ball bearing device according to the invention.

A bearing block is designated 10 in FIG. 1. The bearing block 10 has a mounting or contact surface 12 which, in operation, is in contact with the object to be guided in each case. An abutment edge 14 is used for the exact lateral positioning of the bearing block 10 on the particular object. Threaded fastening bores 16 are provided for fastening the bearing block 10 to the particular object. But it is also possible to insert bolts from below into through fastening bores or holes 18, the bolts then being screwed into threaded bores on the particular object. As is evident from FIG. 1, the fastening bores 18 end in end faces of the bearing block 10 remote from the contact surface 12, which end faces are inclined with respect to the contact surface 12 so as to have increasing distance from the contact surface 12 when approaching a middle plane containing the axis A and perpendicular to the contact surface 12.

Figure 2:
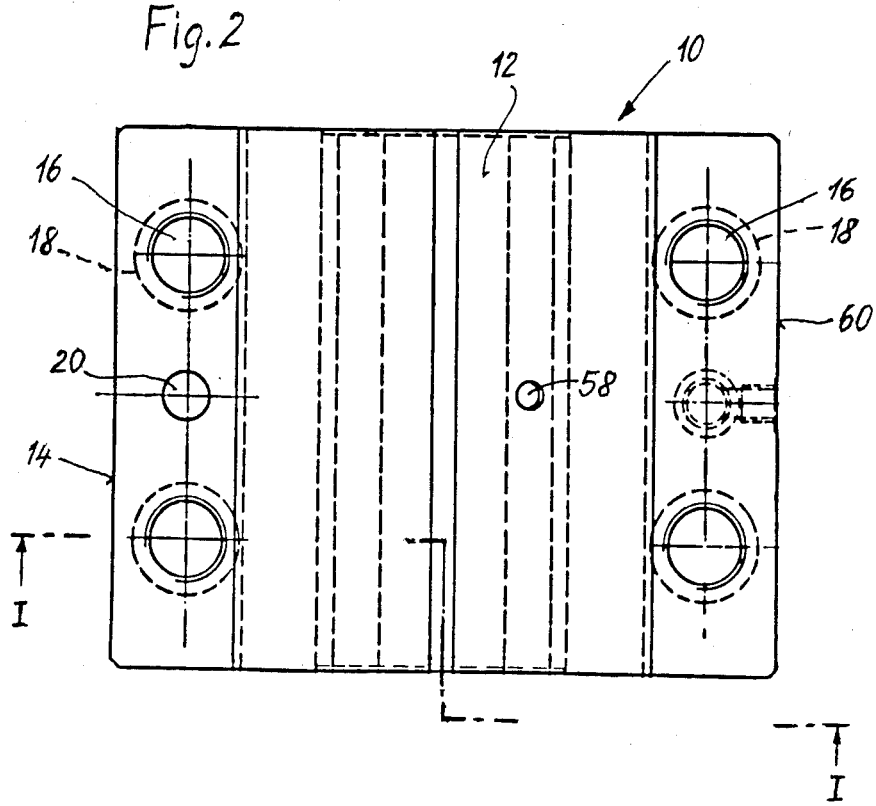
FIG. 2 shows a plan view of the linear ball bearing device of FIG. 1.

A bore 20 (FIG. 2) permits pinned fitting.

The bearing block 10 has a bore with a cylindrical inner surface 22. The bore is open through an annular opening 24 in the surface opposite the contact surface 12. In order to guide the bearing block 10 along a cylindrical shaft accommodated in the bore, a plurality of ball loops 26 are provided which in each case lie in a radial plane R with respect to the axis A of the associated shaft (not shown). The ball loops 26 comprise a radially inner, load-carrying ball row 26a, a radially outer ball row 26b running in the reverse direction, and curved ball deflection rows or junctures 26c.

The radially inner, load-carrying ball row 26a, as shown in FIG. 6, runs on a load-carrying surface 22a which is a part of the cylindrical inner surface 22. As can be seen from FIGS. 1 and 6, the balls of the radially inner, load-carrying ball row 26a are guided laterally by guide surfaces 28aa of guide webs 28a. The guide webs 28a are part of a cage sub-assembly 28 which is divided into two half cages 28I and 28II by a dividing plane T which is normal to the axis.

The radilly outer ball rows 26b run in the reverse direction and are guided by return channels 30. The ball deflection rows 26c are guided by an axially outwardly directed, convex toroidal surface 32 from the material of the bearing block 10 and in each case by an individual, concave, axially inwardly directed semi-circular groove 28c. The semi-circular grooves 28c are formed in annular hook flanges 28b in the cage sub-assembly 28.

The hook flanges 28b are best shown in FIGS. 4 and 5. The hook flanges 28b are positioned with their outer peripheral surfaces 28d on inner peripheral surfaces 34 of the bearing block 10. Each hook flange 28b has a hook end surface 28e which sits on a channel aperture surface 36 of the bearing block 10. The guide webs 28a are positioned on the cylindrical inner surface 22 or are distanced from the latter by a slight gap. The cage sub-assembly 28 is fixed on the bearing block 10 in the axial direction by two retaining rings 38 which are engaged in locating grooves 40 of the bearing block 10. As can be seen from FIG. 1, the cage sub-assembly 28 is fixed in the peripheral direction by edge lips 44 which are positioned at the boundary surfaces of the annular opening 24. In addition, a longitudinal rib 46 is provided in each case which engages in a groove of the bearing block 10.

Sealing elements 48 are attached to the cage sub-assembly 28 at its axial ends, the sealing elements 48 being adapted for contact with the cylindrical shaft. Moreover, sealing strips 42 are attached to the cage sub-assembly 28 in the neighbourhood of the opening 24. The sealing elements 48 and the sealing strips 42 are attached by adhesive, inserted in grooves or fixed by ultrasonic welding. Their purpose is to prevent the escape of lubricant and to prevent the ingress of dirt to the ball rows. The sealing elements 48 and the sealing strips 42 are made of plastics material or of an elastomeric material. The sealing elements 48 are inserted in annular grooves 50 of the respective half cage 28I or 28II.

The ends of the guide webs 28a of the two half cages 28I and 28II, which ends face toward one another, are secured to one another by pins 52 and are kept in alignment. The pins 52 can be replaced by integrally formed, complementary projections and recesses.

As can be seen from FIG. 1, the linear ball bearing device has a means of subsequent lubrication. Such means comprises a primary lubricating channel 54 which extends to a lateral surface 60 which is normal to the axis and is substantially parallel to the contact surface 12. The primary lubricating channel 54 intersects a secondary channel 56 which is bored from the contact surface 12. The secondary channel 56 ends at the cylindrical inner surface 22 between two consecutive ball loops 26, that is, between the particular radially inner, load-carrying ball rows of these ball loops. The secondary channel 56 is closed at its outer end by a plug 58. The lubricant fed from the lateral surface 60 through the lubricant channels 54 and 56 flows to the inner, load-carrying ball rows 26a of the two adjacent ball loops 26 and is distributed over all of the other ball loops from which it flows over the peripheral surface of the cylindrical shaft.

In order to adjust the bearing play, a slot 62, which starts from the lateral surface 60, is cut in the bearing block 10. The slot 62 extends almost up to the pitch circle of the return channels 30 and is substantially parallel to the contact surface 12. A threaded bore 64 is provided in a part 10a of the bearing block 10. Mounted in the threaded bore 64 is a clamping stud 66. The clamping stud 66 has an upper end mounted in a socket 68 of a part 10b of the bearing block 10, the part 10b being located on the other side of the slot 62. By screwing the clamping stud 66 upwardly, the part 10a of the bearing block 10 can be swung elastically in the clockwise direction about the material web at the inner end of the slot 62, by means of which the radial play can be adjusted. At the same time, a pre-tension can also be set, as a result of which an increased rigidity is achieved. It is also possible to provide two adjusting slots, Thus the second adjusting slot could be arranged symmetrically to the first adjusting slot with respect to a vertical plane of symmetry in FIG. 1 passing through the axis A.

It is also possible to displace the opening 24 by 90° compared with what is shown in FIG. 1.

In order to increase the basic load rating by improving the contact conditions, ball grooves 122a may be provided as shown in FIG. 8. Although the ball grooves 122a required a greater production expenditure, they lead to a considerable increase in the basic load rating and to a further improvement in the rigidity.

As shown in FIG. 7, ball grooves 222a may be provided which are arranged on ribs 270 of the bearing block 10.

Compared with the previously known bearing embodiment, the construction shown in the drawings has the advantage that the enveloping circle tolerance (radial play) and the height tolerance are reduced. In the known linear ball bearing the enveloping circle tolerance is determined by three factors, namely sleeve inside diameter of the ball bush, sleeve outside diameter of the ball bush, and inside diameter of the bore in the bearing block. However, only one factor has an effect according to the present invention, namely the diameter of the cylindrical inner surface 22. The height tolerance, in other words the distance between the contact surface 12 and the axis of the cylindrical inner surface 22, only depends on one factor, namely the base thickness, that is, the distance between the contact surface 12 and the cylindrical inner surface 22. According to the prior art, this height tolerance depended on three factors, namely the sleeve inner diameter, the sleeve outer diameter of the ball bush and the base thickness of the bearing block.

The saving in weight compared with the known embodiment discussed above is 60 to 70%. Compared with this known embodiment, the dimensions are reduced as follows: Length reduction (measured in the axial direction) 35 to 42%; width reduction (measured perpendicular to the surface 60) 16 to 29%; height reduction (measured perpendicular to the contact surface 12) 27 to 33%. In a normal installation of four bearing devices, a saving in weight of about 186 kg is obtained, for example, for a shaft diameter of 80 mm. The four bearing devices together weigh about 118 kg (compared with 304 kg in the known arrangement). This of course is based on an undiminished basic load rating and the same rigidity.

The reduction in weight is of great interest, especially in modern machines which work with ever greater speeds, and thus greater acceleration. This is because the inertia forces are considerably reduced by these savings in weight, so that even the drives can be made more low-powered and more economical.

I claim:

1. A linear ball-bearing device for guiding an object along a cylindrical shaft having an axis, comprising a bearing block having at least one planar contact surface for contacting said object and having a plurality of ball loops, each of said ball loops comprising radially inner and radially outer ball ball rows interconnected by curved ball deflection junctures, the radially inner ball rows being supported radially outwardly on axially extending load-carrying surfaces which are distributed along a cylindrical inner surface of said bearing block, the radially outer ball rows running in return channels in said bearing block and said curved ball deflection junctures being guided by concave semi-circular grooves which are arranged on a cage sub-assembly, said cage sub-assembly having hook flanges each of which has an axially inwardly directed hook end surface engaging an axially outwardly directed channel aperture surface of the respective return channel, each hook flanges also having an outer peripheral surface for engagement with an inner peripheral surface of said bearing block, the load-carrying surfaces, the return channels, the inner peripheral surfaces and the channel aperture surfaces being integrally formed on the material of the bearing block, said bearing block having fastening bores substantially perpendicular to said planar contact surface and extending in said bearing block at locations radially outwards of said return channels and axially within the axial length of said ball loops.

2. A device as claimed in claim 1 in which the bearing block has fastening means for fastening an object to the bearing block.

3. A device as claimed in claim 1 in which each ball loop is arranged in a radial plane with respect to the axis of the cylindrical shaft.

4. A device as claimed in claim 1 in which the load-carrying surfaces extend between guide surfaces spaced in the peripheral direction, the guide surfaces being arranged on the cage sub-assembly.

5. A device as claimed in claim 1 in which the deflectioncurve ball rows are also guided by a convex toroidal surface which is directed radially outwardly.

6. A device as claimed in claim 1 in which the cage sub-assembly has guide webs which extend over the length of the load-carrying surfaces, the hook flange being provided on the axial ends of the guide webs.

7. A device as claimed in claim 1 in which the cage sub-assembly is divided into two half cages in a dividing plane normal to the axis and cutting the guide webs.

8. A device as claimed in claim 7 wherein the guide web sections of the half cages are dowel-joined to one another in the dividing plane.

9. A device as claimed in claim 1 wherein the load-carrying surfaces are arranged on load-carrying ribs of the bearing block, said ribs projecting radially inwardly relative to the said cylindrical inner surface.

10. A device as claimed in claim 1 wherein the load-carrying surfaces are formed by grooves in the bearing block.

11. A device as claimed in claim 1 wherein the load-carrying surfaces are formed by partial areas of the said cylindrical inner surface.

12. A device as claimed in claim 1 wherein a sealing element for contact with the shaft is attached to the hook flanges.

13. A device as claimed in claim 1 wherein the cage sub-assembly is secured in the axial direction by retaining rings which are engaged in locating grooves integrally formed in the bearing block.

14. A linear ball-bearing device for guiding an object along a cylindrical shaft having an axis, said device comprising a bearing block having at least one planar contact surface for contacting said object and having at least four ball loops, each ball loops comprising radially inner and radially outer ball rows interconnected by curved ball deflection junctures, said radially inner ball rows being supported radially outwardly on axially extending load-carrying surfaces which are distributed along a cylindrical inner surface of said bearing block, said radially outer ball rows running in return channels in said bearing block with said curved ball deflection junctures being guided by concave semi-circular grooves which are arranged on a cage sub-assembly, said cage sub-assembly having hook flanges each of which has an axially inwardly directed hook end surface engaging an axially outwardly directed channel aperture surface of the respective return channel, each hook flange also having an outer peripheral surface of engagement with an inner peripheral surface of said bearing block, the load-carrying surfaces, the return channels, the inner peripheral surfaces and the channel aperture surfaces being integrally formed on the material of said bearing block, said device further comprising pressure means for adjusting radial play therein.

15. A device as claimed in claim 14 in which the bearing block has an opening for partially enclosing the cylindrical shaft.

16. A device as claimed in claim 15 in which the contact surface is arranged on a side of the bearing block which is remote from the opening for partially enclosing the cylindrical shaft, there being a slot which is substantially parallel to the contact surface and which extends from a lateral surface of the bearing block, the lateral surface being parallel to the axis and being essentially at right angles to the contact surface, a threaded bore which is substantially perpendicular to the slot plane being provided in a part of the bearing block which is located on one side of the slot, the threaded bore accommodating a threaded stud which can be fastened against the part of the bearing block which is located on the other side of the slot plane.

17. A device as claimed in claim 16, wherein the slot substantially parallel to the bearing surface extends approximately to the pitch circle of the return channels.

18. A device as claimed in claim 15 wherein sealing strips for contact with the shaft are attached to edges of the cage sub-assembly.

19. A linear ball-bearing device for guiding an object along a cylindrical shaft having an axis, said device comprising a bearing block having at least one planar contact surface for contacting said object and having at least four ball loops, each ball loop comprising radially inner and radially outer ball rows interconnected by curved ball deflection junctures, said radially inner ball rows being supported radially outwardly on axially extending load-carrying surfaces which are distributed along a cylindrical inner surface of said bearing block, said radially outer ball rows running in return channels in said bearing block with said curved ball deflection junctures being guided by concave semi-circular grooves which are arranged on a cage sub-assembly, said cage sub-assembly having hook flanges each of which has an axially inwardly directed hook end surface engaging an axially outwardly directed channel aperture surface of the respective return channel, each hook flange also having an outer peripheral surface for engagement with an inner peripheral surface of said bearing block, the load-carrying surfaces, the return channels, the inner peripheral surfaces and the channel aperture surfaces being integrally formed on the material of said bearing block, said bearing block being provided with a lubricating channel system which starts from a freely accessible surface of said bearing block even when the latter is mounted on the object.

20. A linear ball-bearing device for guiding an object along a cylindrical shaft having an axis, comprising a bearing block having at least one planar contact surface for contacting said object and having a plurality of ball loops, each of said ball loops comprising radially inner and radially outer ball rows interconnected by curve ball deflection junctures, the radially inner ball rows being supported radially outwardly on axially extending load-carrying surfaces which are distributed along a cylindrical inner surface of said bearing block, the radially outer ball rows running in return channels in said bearing block and said curved ball deflection junctures being guided by concave semi-circular grooves which are arranged on a cage sub-assembly, said cage sub-assembly having hook flanges each of which has an axially inwardly directed hook end surface engaging an axially outwardly directed channel aperture surface of the respective return channel, each hook flange also having an outer peripheral surface for engagement with an inner peripheral surface of said bearing block, the load-carrying surfaces, the return channels, the inner peripheral surfaces and the channel aperture surfaces being integrally formed on the material of the bearing block, said bearing block having fastening bores substantially perpendicular to said planar contact surface and completely extending through said bearing block at locations radially outwards of said return channels and axially within the axial length of said ball loops, said bearing block being provided with a lubricating channel system which starts from a freely accessible surface of the bearing block even when the latter is mounted on the object.

21. A device as claimed in claim 19 wherein the lubricating channel system is disposed in a plane substantially normal to the axis and comprises a primary channel which is substantially parallel to the contact surface and a secondary channel which communicates with the primary channel, the secondary channel being bored from the contact surface, being closed in the area of the latter, and opening into the cylindrical inner surface between adjacent ball loops.

22. A linear ball-bearing device for guiding an object along a cylindrical shaft having an axis, comprising a bearing block having at least one planar contact surface for contacting said object and having a plurality of ball loops, each of said ball loops comprising radially inner and radially outer ball rows interconnected by curved ball deflection junctures, the radially inner ball rows being supported radially outwardly on axially extending load-carrying surfaces which are distributed along a cylindrical inner surface of said bearing block, the radially outer ball rows running in return channels in said bearing block and said curved ball deflection junctures being guided by concave semi-circular grooves which are arranged on a cage sub-assembly, said cage sub-assembly having hook flanges each of which has an axially inwardly directed hook end surface engaging an axially outwardly directed channel aperture surface of the respective return channel, each hook flange also having an outer peripheral surface for engagement with an inner peripheral surface of said bearing block, the load-carrying surfaces, the return channels, the inner peripheral surfaces and the channel aperture surfaces being integrally formed on the material of the bearing block, said bearing block having fastening bores substantially perpendicular to said planar contact surface and completely extending through said bearing block at locations radially outwards of said return channels and axially within the axial length of said ball loops, said fastening bores ending in end faces of said bearing block remote from said contact surface, which end faces are inclined with respect to said contact surface such as to have increasing distance from said contact surface when approaching a middle plane containing said axis and perpendicular to said contact surface.

23. A linear ball-bearing device for guiding an object along a cylindrical shaft having an axis, comprising a bearing block having at least one planar contact surface for contacting said object and having a plurality of ball loops, each of said ball loops comprising radially inner and radially outer ball rows interconnected by curved ball deflection junctures, the radially inner ball rows being supported radially outwardly on axially extending load-carrying surfaces which are distributed along a cylindrical inner surface of said bearing block, the radially outer ball rows running in return channels in said bearing block and said curved ball deflection junctures being guided by concave semi-circular grooves which are arranged on a cage sub-assembly, said cage sub-assembly having hook flanges each of which has an axially inwardly directed hook end surface engaging an axially outwardly directed channel aperture surface of the respective return channel, each hook flange also having an outer peripheral surface for engagement with an inner peripheral surface of said bearing block, the load-carrying surfaces, the return channels, the inner peripheral surfaces and the channel aperture surfaces being integrally formed on the material of the bearing block, said bearing block having fastening bores substantially perpendicular to said planar contact surface and completely extending through said bearing block at locations radially outwards of said return channels and axially within the axial length of said ball loops, and further including pressure means for adjusting radial play therein.

24. A linear ball-bearing device for guiding an object along a cylindrical shaft having an axis, said device comprising a bearing block having at least one planar contact surface for contacting said object and having at least four ball loops, each ball loop comprising radially inner and radially outer ball rows interconnected by curved ball deflection junctures, said radially inner ball rows being supported radially outwardly on axially extending load-carrying surfaces which are distributed along a cylindrical inner surface of said bearing block, said radially outer ball rows running in return channels in said bearing block with said curved ball deflection junctures being guided by concave semi-circular grooves which are arranged on a cage sub-assembly, said cage sub-assembly having hook flanges each of which has an axially inwardly directed hook end surface engaging an axially outwardly directed channel aperture surface of the respective return channel, each hook flange also having an outer peripheral surface for engagement with an inner peripheral surface of said bearing block, the load-carrying surfaces, the return channels, the inner peripheral surfaces and the channel aperture surfaces being integrally formed on the material of said bearing block, the distance of said cylindrical inner surface from said contact surface being 25% to 50% of the diameter of the associated shaft.

25. A linear ball-bearing device for guiding an object along a cylindrical shaft having an axis, said device comprising a bearing block having at least one planar contact surface for contacting said object and having at least four ball loops, each ball loop comprising radially inner and radially outer ball rows interconnected by curved ball deflection junctures, said radially inner ball rows being supported radially outwardly on axially extending load-carrying surfaces which are distributed along a cylindrical inner surface of said bearing block, said radially outer ball rows running in return channels in said bearing block with said curved ball deflection junctures being guided by concave semi-circular grooves which are arranged on a cage sub-assembly, said cage sub-assembly having hook flanges each of which has an axially inwardly directed hook end surface engaging an axially outwardly directed channel aperture surface of the respective return channel, each hook flange also having an outer peripheral surface for engagement with an inner peripheral surface of said bearing block, the load-carrying surfaces, the return channels, the inner peripheral surface and the channel aperture surfaces being integrally formed on the material of said bearing block, said bearing block including a lateral surface parallel to said axis and substantially perpendicular to said contact surface, said lateral surface being spaced from said cylindrical inner surface a distance which is 65% to 120% of the diameter of the associated shaft.

* * * * *

UNITED STATES PATENT AND TRADEMARK OFFICE
CERTIFICATE OF CORRECTION

PATENT NO. : 4,723,850
DATED : February 9, 1988
INVENTOR(S) : Ernst Albert

It is certified that error appears in the above-identified patent and that said Letters Patent is hereby corrected as shown below:

Title page:

[73] Assignee: Deutsche Star GmbH

Signed and Sealed this

Thirteenth Day of December, 1988

*Attest:*

DONALD J. QUIGG

*Attesting Officer*   *Commissioner of Patents and Trademarks*